United States Patent
Nadig et al.

(10) Patent No.: US 12,080,268 B1
(45) Date of Patent: Sep. 3, 2024

(54) GENERATING EVENT OUTPUT

(71) Applicant: Amazon Technologies, Inc., Seattle, WA (US)

(72) Inventors: Vinaya Nadig, Bothell, WA (US); Rafael Colorado Vargas, Austin, TX (US); Yugandhar Maram, Redmond, WA (US); Samarth Bhargava, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 16/834,800

(22) Filed: Mar. 30, 2020

(51) Int. Cl.
*G10L 13/00* (2006.01)
*G06F 9/54* (2006.01)
*G06F 40/205* (2020.01)
*G06F 40/279* (2020.01)

(52) U.S. Cl.
CPC ............. *G10L 13/00* (2013.01); *G06F 9/542* (2013.01); *G06F 40/205* (2020.01); *G06F 40/279* (2020.01)

(58) Field of Classification Search
None
See application file for complete search history.

(56) References Cited

U.S. PATENT DOCUMENTS

| | | | |
|---|---|---|---|
| 6,795,808 B1 * | 9/2004 | Strubbe | G06F 16/90332 704/E15.04 |
| 11,064,339 B2 * | 7/2021 | Hamre | H04M 3/5116 |
| 2013/0115927 A1 * | 5/2013 | Gruber | G06Q 10/109 455/414.1 |
| 2015/0172463 A1 * | 6/2015 | Quast | H04M 3/4936 379/88.01 |
| 2018/0182380 A1 * | 6/2018 | Fritz | H04M 7/0042 |
| 2020/0104194 A1 * | 4/2020 | Chalmers | G06F 3/0346 |
| 2020/0211553 A1 * | 7/2020 | Bohl | G10L 13/00 |
| 2021/0044955 A1 * | 2/2021 | Lu | G06F 16/9535 |

* cited by examiner

*Primary Examiner* — Nicole A K Schmieder
(74) *Attorney, Agent, or Firm* — Pierce Atwood LLP

(57) ABSTRACT

A system is provided for determining customized notification output based on user preferences and event information. A user may request a system to provide a notification when a future event occurs. The system may determine a custom notification/output template for the notification, where a portion of the template is determined based on a user preference. When the event occurs, the system may generate a notification using the template, where portions of the notification are determined using event information and user preferences.

20 Claims, 13 Drawing Sheets

502
"Today's weather is <insert weather data>. Remember to bring <insert weather-specific item>"
"Today's weather is rainy. Remember to bring an umbrella"

504

506
"The <insert sports event> is starting. Go <insert user's preferred team; use emphasis>!"
"The Seahawks game is starting. Go Hawks!"

508

510
"Here is the score update: <insert score data>. Go <insert user's preferred team>!"
"Here is the score update: Seahawks 21; Patriots 7. Go Hawks!"

512

514
"Here is the score update: <insert score data>. Booo <insert opposing team>!"
"Here is the score update: Seahawks 7; Patriots 21. Booo Patriots!"

516

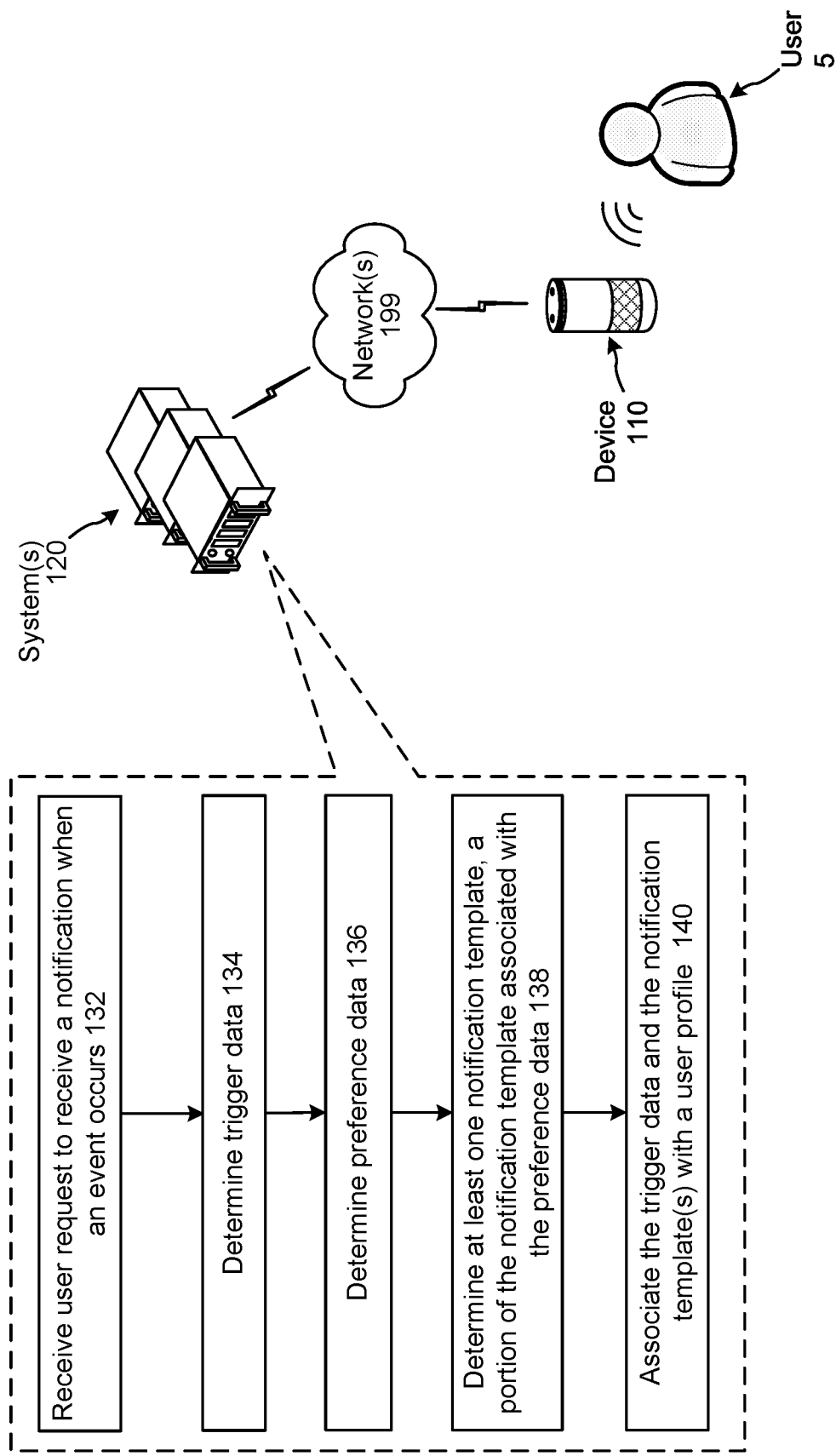

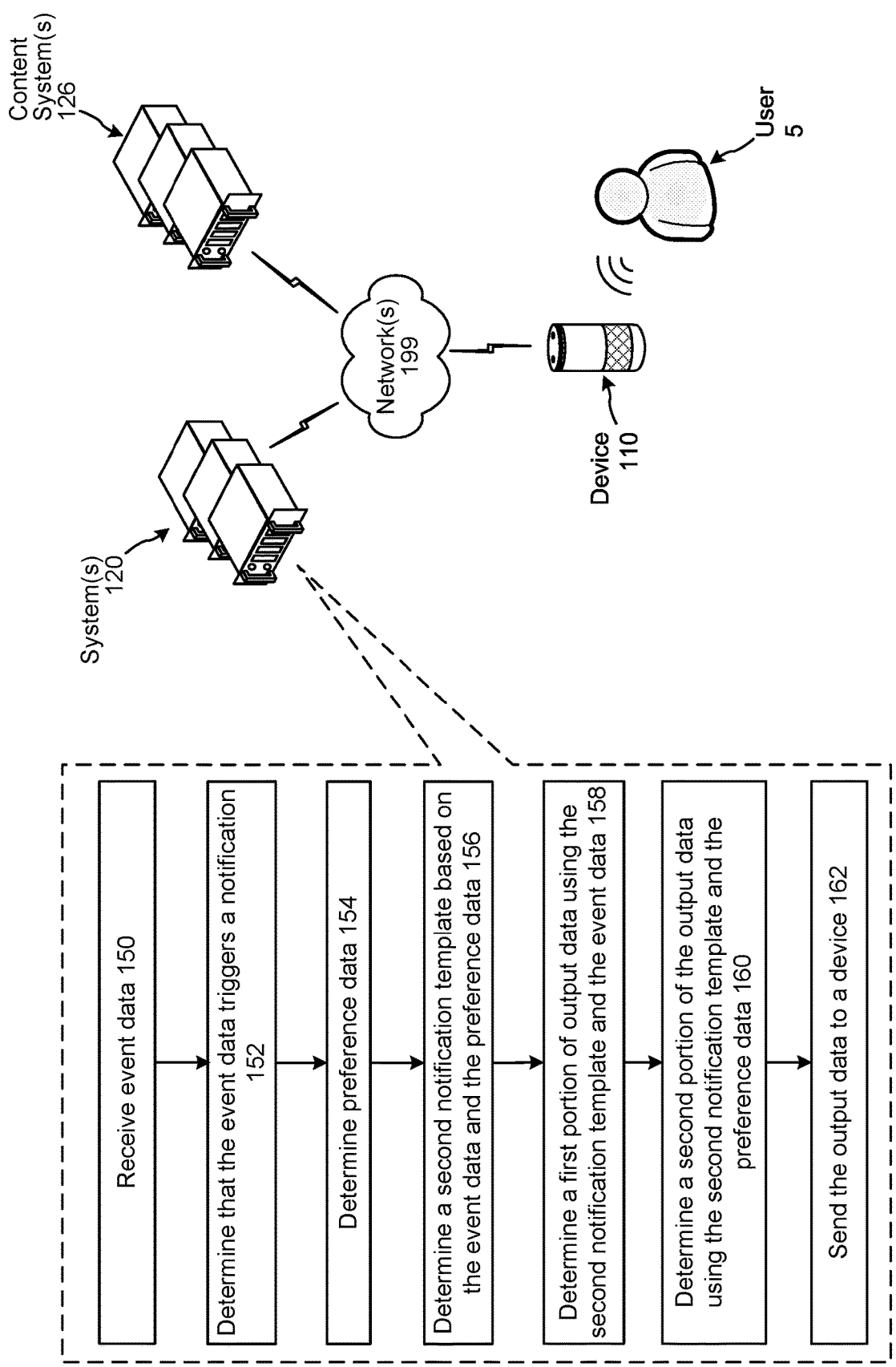

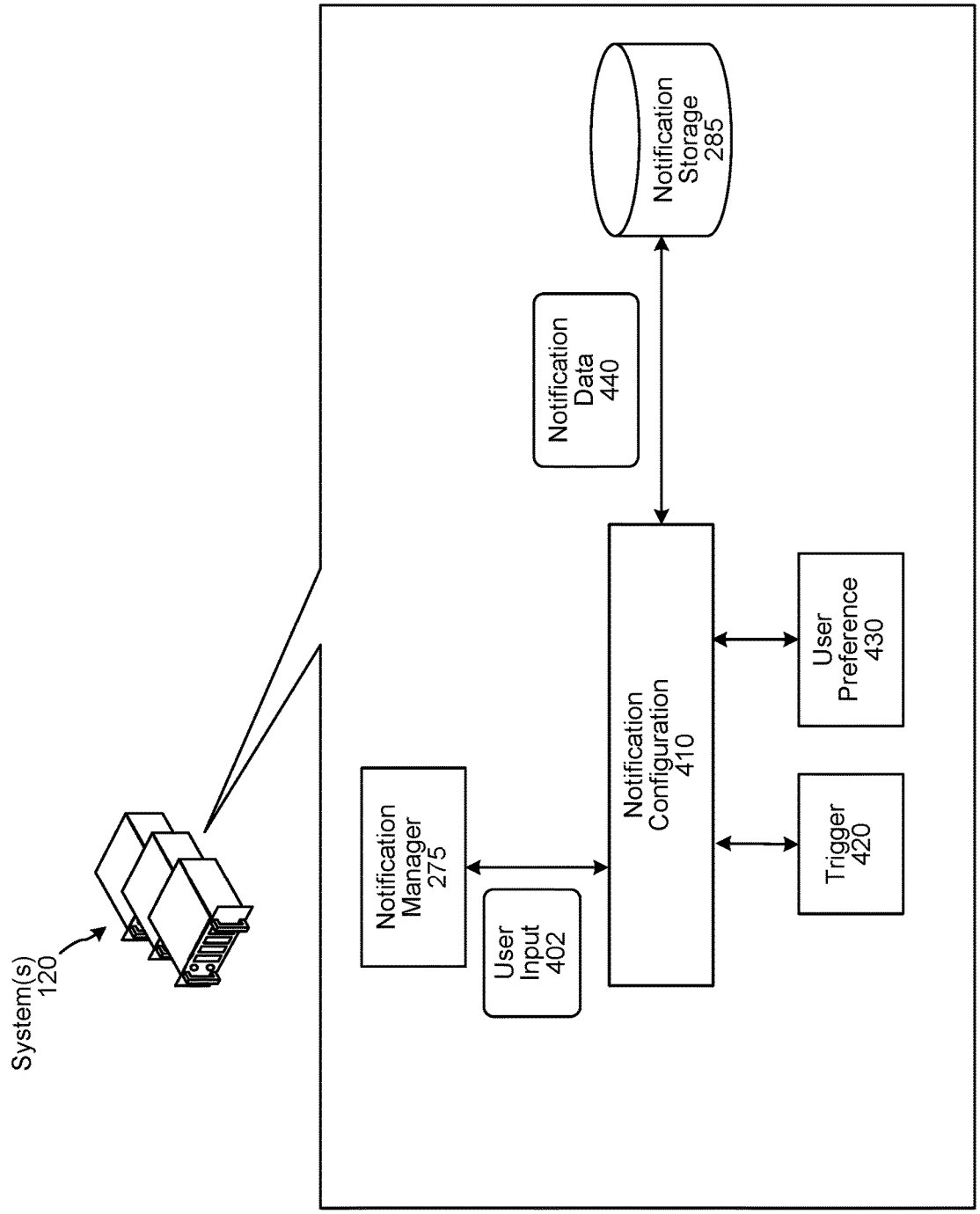

GENERATING EVENT OUTPUT

BACKGROUND

Spoken language understanding (SLU) systems have progressed to the point where humans can interact with computing devices using their voices. Such systems employ techniques to identify the words spoken by a human user based on the various qualities of a received audio input. An SLU system combines speech recognition and natural language understanding processing techniques enabling speech-based user control of a computing device to perform tasks based on the user's spoken commands. The combination of speech recognition and natural language understanding techniques is referred to herein as natural language processing. Natural language processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to respond to a user request to receive an output in the future when an event occurs according to embodiments of the present disclosure.

FIG. 1B illustrates a system configured to generate output data, using a custom output template, when an event occurs according to embodiments of the present disclosure.

FIG. 4A is a conceptual diagram of a notification manager to generate notification data based on a user request according to embodiments of the present disclosure.

DETAILED DESCRIPTION

Figure 2:
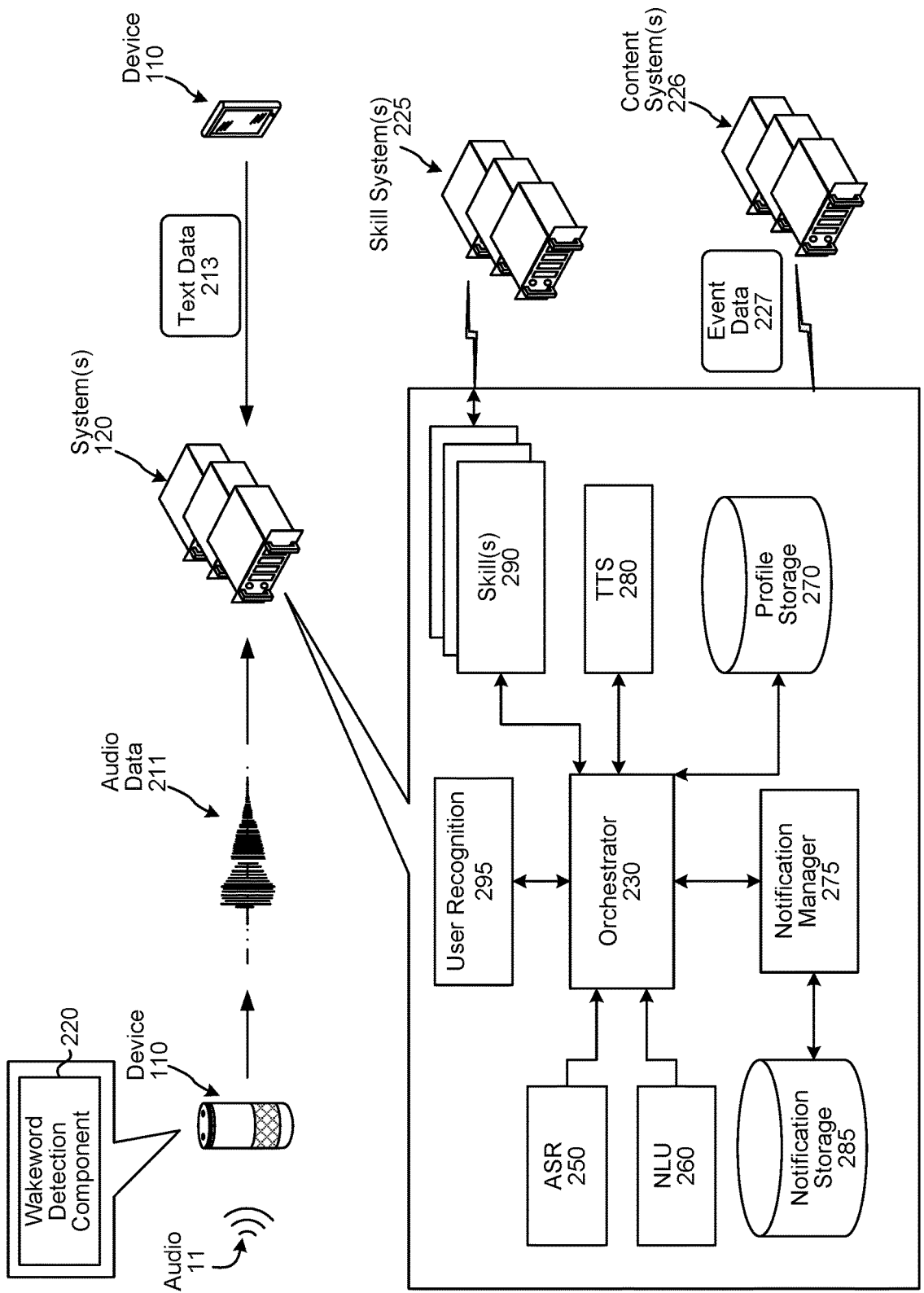
FIG. 2 is a conceptual diagram of components of a system according to embodiments of the present disclosure.

Automatic speech recognition (ASR) is a field of computer science, artificial intelligence, and linguistics concerned with transforming audio data associated with speech into text or other meaning representation data of the words in the speech. Natural language understanding (NLU) is a field of computer science, artificial intelligence, and linguistics concerned with enabling computers to derive semantic meaning from ASR output or other data representing natural language content. ASR and NLU are often used together as part of a spoken language understanding (SLU) system. Natural language generation (NLG) is a process that transforms structured data into natural language. Text-to-speech (TTS) is a field of concerning transforming textual or other meaning representation data into audio data that is synthesized to resemble human speech.

A system may receive a user input requesting the system to perform a particular action when a particular event occurs in the future. For example, a user input may be "Alexa, tell me when the Seahawks game starts," and the system may create and store notification data that causes the system to generate and send a notification to the user when the Seahawks game starts. Another user input may be "remind me to close the windows when it rains," and the system may create and store notification data that causes the system to generate and send a notification to the user when it rains, where the notification reminds the user to close the windows. The notification outputted to the user may include information related to the event that occurred, for example, the notification may be "the Seahawks game started." In some cases, the notification outputted to the user may include information requested by the user, for example, the notification may be "it is raining, remember to close the windows." A user may register/subscribe to receive the notification when the event occurs.

The improved system of the present disclosure may customize the content of the notification based on the event type, user preferences, and other factors. For example, the system may determine that the user is a fan of the Seahawks sports team, and may add certain pleasantries and/or emphasis to the notification outputted for the user when the Seahawks game starts. The notification, in this case, may be "The Seahawks game is starting. Go Hawks!" In another example, if the user requests to be notified when a score change occurs during the Seahawks game and the opposing team is leading, then the system may generate the notification "There is a score update: Seahawks 7, Patriots 14. The Seahawks can still come back" or "There is a score update: Seahawks 7, Patriots 14. Booo Patriots."

The system may determine an output template to provide the notification. The output template may specify the content of the notification, including any customizations to be applied to the content. A portion of the output template may be determined when the user registers to receive the notification, where this portion may convey occurrence of the event. Another portion of the output template may be determined when the event occurs and the system is to provide the notification to the user, where this portion may be personalized/customized based on the user's preferences and other information related to the user. The system may determine the user preferences using profile data corresponding to the user, data related to past interactions between the user and the system, data related to the user request to receive the notification when the event occurs, etc. The system may use the user preferences when the user registers to determine a customized output template. The system may also use the user preferences when the event occurs to determine any customizations to be applied to the notification right before the notification is to be presented to the user.

The system may determine a customized output template using information related to the event. The system may determine different output templates for different event content. For example, if the user requests a notification when a score change occurs in a game, the system may determine a first output template for when the user's favorite/preferred team is winning and a second output template for when the user's favorite/preferred team is losing.

The system of the present disclosure may provide a more desirable user experience by customizing notifications for a user instead of providing a generic notification, where the customization can be determined right before generating the output data, thus, providing a more engaging system that may increase a user response/engagement with the system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates a system configured to process to a user request to receive an output/notification in the future when an event occurs according to embodiments of the present disclosure. FIG. 1B illustrates a system configured to generate output data/notification when an event occurs according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIGS. 1A and 1B, the system may include device 110 local to a user 5, in communication with one or more systems 120 across one or more networks 199, and in communication with one or more content system(s) 126.

The system(s) 120 receives (132) a user request to receive a notification when an event occurs. The user request may be a user input including audio data representing an utterance spoken by the user 5 and captured by the device 110. The system(s) 120 may perform automatic speech recognition (ASR) processing on the audio data to determine text data corresponding to the user input. In some embodiments, the user input may be text data or another form of data. The system(s) 120 may perform natural language understanding (NLU) on the text data/user input to determine the user's intent to receive an output in the future when an event occurs. For example, the user request may be "tell me when I receive an email from Joe", "tell me when the Seahawks play", "remind me to close the windows every time it rains", etc.

The system(s) 120 determines (134) trigger data corresponding to the user request. The trigger data represents a triggering event that causes generation of the notification/output. The system(s) 120 may perform natural language understanding (NLU) processing on text data/natural language input representing the user request to determine an intent corresponding to the user request. The system(s) 120 may determine that user's intent is to receive an output, such as a notification, or to cause the system to perform an action in response to an occurrence of an event. The system(s) 120 may determine, using NLU and the text data, the trigger data for executing an action. For example, if the user request is "notify me when I receive an email," the system(s) 120, using NLU, may determine that the intent is to receive a notification, the slot indicating the trigger/event for receiving the notification is when the user receives an email, and the action to be executed when the user receives an email is to send the user a notification. As another example, the user input may be "turn on the lights when I arrive home," and the system(s) 120, using NLU, may determine that the intent is to perform a smart-home action, the trigger slot is when the user arrives home, and the action to be executed is turning on the lights. As another example, the user input may be "tell me when the Seahawks game starts," and the system(s) 120, using NLU, may determine that the intent is to receive a notification in the future, the trigger is when the Seahawks game starts, and the action to be executed when the Seahawks game starts is to send the user a notification.

The system(s) 120 determines (136) preference data corresponding to the user profile and the triggering event. The system(s) 120 may determine preference data indicating the user 5 preference for one or more entities corresponding to the event, one or more items corresponding to the event, or another preference related to the event. The system(s) 120 may determine preference data using profile data associated with the user 5, user interactions data corresponding to past interactions between the user 5 and the system(s) 120, user feedback/input relating to the event/entity(ies)/item(s) corresponding to the event, and other data relating to the user 5. For example, if the triggering event is when the Seahawks game starts, the system(s) 120 may determine preference data indicating the user's preference for the Seahawks football team (based on the entity Seahawks corresponding to the triggering event). In another example, if the triggering event is when the Seahawks game starts, the system(s) 120 may determine preference indicating the user's preference for an opposing team in the game—Patriots football team (based on the entity Patriots corresponding to the triggering event, even though Patriots is not mentioned in the user request).

The system(s) 120 determines (138) at least one notification template using at least the trigger data and the preference data, where a portion of the notification template is associated with the preference data. The system(s) 120 may use the trigger data to determine a portion of the notification template to describe the event occurrence. The system(s) 120 may use the preference data to determine another portion of the notification template, which may be customized to the user 5. A notification template may indicate words/phrases to be included in the notification and may indicate placeholders for inserting content/data during execution. Further details on how the system(s) 120 determines a customized notification template are described in relation to FIG. 4A. The system(s) 120 may determine different notification templates for a single user request, where the different templates may depend on the content of the event that occurs. The system(s) 120 may determine different notification templates for different users for the same user request to receive a notification for an event occurrence.

The system(s) 120 associates (140) the trigger data and the notification template(s) with the user profile. The system(s) 120 may use the trigger data and the notification templates at a later time to determine when a notification is triggered with respect to the user 5 and what the content of the notification should be. The trigger data and the notification templates may be stored in a notification storage 285.

FIG. 1B illustrates the system(s) 120 during execution when an event occurs. The system(s) 120 receives (150)

event data indicating occurrence of an event. The system(s) 120 may receive the event data from one or more content system(s) 126. In some embodiments, the system(s) 120 may receive the event data from one or more skill system(s) 120 or other components/systems. For example, the event data may indicate that the user 5 received an email, a sporting event is starting, it is going to rain, etc. The system(s) 120 determines (152) that the event data triggers a notification for the user 5/user profile. The system(s) 120 may use the stored trigger data to determine that the event data indicates occurrence of an event that the user wanted to receive a notification for. For example, the system(s) 120 may determine that the received email is from the specified contact (e.g., Joe), the sporting event that is starting relates to the one specified by the user (e.g., Seahawks game), etc.

The system(s) 120 determines (154) preference data associated with the user 5. The preference data may be related to the occurred event. The system(s) 120 may determine the preference data in a similar manner as described above with respect to step 136. Prior to generating the notification, the system(s) 120 may update the preference data to account for any changes in the user's preferences, information related to the user, information related to the occurrence of the event, and other information since the user registered to receive the notification.

The system(s) 120 determines (156) a second notification template based on the event data and the preference data. The second notification template may be based on the content of the event/event content data. The second notification template may be different than the notification template determined at step 138. A portion of the second notification template may describe occurrence of the event, and another portion of the second notification template may be related to the preference data. Prior to determining the content of the notification, the system(s) 120 may choose between the second notification template determined right before presenting the output/after event occurrence and the notification template associated with the trigger data that was determined when the user registered to receive the notification. The system(s) 120 may select a notification template based on context information related to the user, context information related to the event, device capabilities, user presence data, location data, and other information.

The system(s) 120 determines output data to present a notification to the user 5 of the event occurrence. The system(s) 120 determines (158) a first portion of the output data using the notification template and the event data. The first portion of the output data may describe the event occurrence. The first portion of the output data may be the same for different users describing the event occurrence. The system(s) 120 determines (160) a second portion of the output data using the notification template and the preference data. The second portion of the output data may be customized to the user 5 receiving the notification. The second portion of the output data may be different for different users. For example, for a first user, the output data may be "The Seahawks game is starting. Go Hawks!" and for a second user, the output data may be "The Seahawks game is starting. Boooo Hawks!" Further details on how the output data corresponding to the content of the notification is determined are described in relation to FIG. 4B and an output generation component 450.

In some embodiments, at step 156, the system(s) 120 may include additional information in the notification template, where the additional information does not relate to the event data/content, but rather relates to the user, the particular interaction, context information relating to the interaction or the event occurrence, etc. For example, if this is the first interaction of the day between the system(s) 120 and the user 5, then the customized notification template may include certain pleasantries, such as, "good morning <insert user's name>," good afternoon <insert user's name>," "hello <insert user's name>" etc. Thus, the second notification template may be "<Insert time-of-day specific greeting><insert user's name>. The <sports event> is starting." At step 160, the system(s) 120 may determine time-of-day specific greeting based on the time the interaction takes place, for example, if the interaction/notification is provided in the morning then the greeting may be "good morning," if the interaction is in the afternoon then the greeting is "good afternoon," etc.

The output data may be text data representing the content of the notification. The system(s) 120 may process the text data using TTS processing to determine synthesized speech representing the notification. The system(s) 120 sends (162) sends the output data to a device 110 associated with the user 5. The output data may be text data to be presented to the user 5 describing the event occurrence in a customized way. The output data may be audio data representing synthesized speech describing the event occurrence in a customized way.

In some embodiments, the system(s) 120 may determine not to customize the notification for the user 5. For example, when the system(s) 120 detects one or more persons around the user 5/the device 110, then the system(s) 120 may provide a generic notification to the user 5, in particular when the notification is to be announced to the user 5 via the device 110. The system(s) 120 may detect one or more persons near the user 5/the device 110 using presence data, image data (identifying persons other than the user 5), audio data (identifying persons other than the user 5), location data of devices associated with other persons, speaker recognition data, and other data.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the system(s) 120. Upon receipt by the systems(s) 120, the text data 213 may be sent to the orchestrator component 230, which may send the text data 213 to the NLU component 260. The text data 213 may be derived from an input(s) provided by the user 5 via an application/app on the device 110, where the user 5 may use the application/app to determine stored data to receive a notification when a future event occurs (as described in connection with FIG. 1). The text data 213, for example, may be "notify me when I get an email from _____ 38 or "tell me when my prescription for _____ is ready for pickup at the pharmacy."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The notification storage 455 may include data relating to the notification registrations created for users identified by their respective user profiles. For example, the notification storage 455 may include trigger information (indicating when a proactive action is to be executed) and action information (indicating the action that is to be executed). The notification storage 455 may also include information indicating the output type, trigger type and other data.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250 that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

The system(s) 120 may also include the notification manager 275 that may process a user input to create a registration for the user, storing the corresponding trigger data and the action data in the notification storage 455 as described in relation to FIG. 4.

One or more content system(s) 126 may be in communication with the system(s) 120 and may provide event data 227. The event data may represent events that occurred. The content system(s) 126 may relate to various systems that provide different types of data, including event data indicating occurrence of a particular event. For example, the content system(s) 126 may be associated with and may provide data related to weather conditions, information relating to sports, email management system, a prescription/medical data system, a package delivery system, and others. The event data 227, for example, may represent a weather condition occurring, an event occurring relating to sports, receipt of an email, indication that a prescription is ready, indication that a package is delivered or will be delivered, etc. As described in relation to FIGS. 4B, the notification manager 275 may use the event data 227 to determine that an output/notification according to a stored data is triggered.

In some embodiments, the system(s) 120 may monitor content databases, knowledge databases, information available on the Internet, and other sources of information to determine occurrence of an event, determine a change in content/information, and determine availability of new content/information. The system(s) 120 may generate event data indicating occurrence of an event, a change in content/information or availability of new content/information, when such is detected by the system(s) 120. The system(s) 120 may monitor the various sources of information using a keyword(s) to determine occurrence of an event corresponding to the keyword(s), determine change in content/information corresponding to the keyword(s), and determine availability of new content/information corresponding to the keyword(s). Using the event data, the system(s) 120 may determine that an output (such as an announcement, a push notification, a visual notification, an audible notification, or other types of output) is triggered according to stored data.

Figure 3:
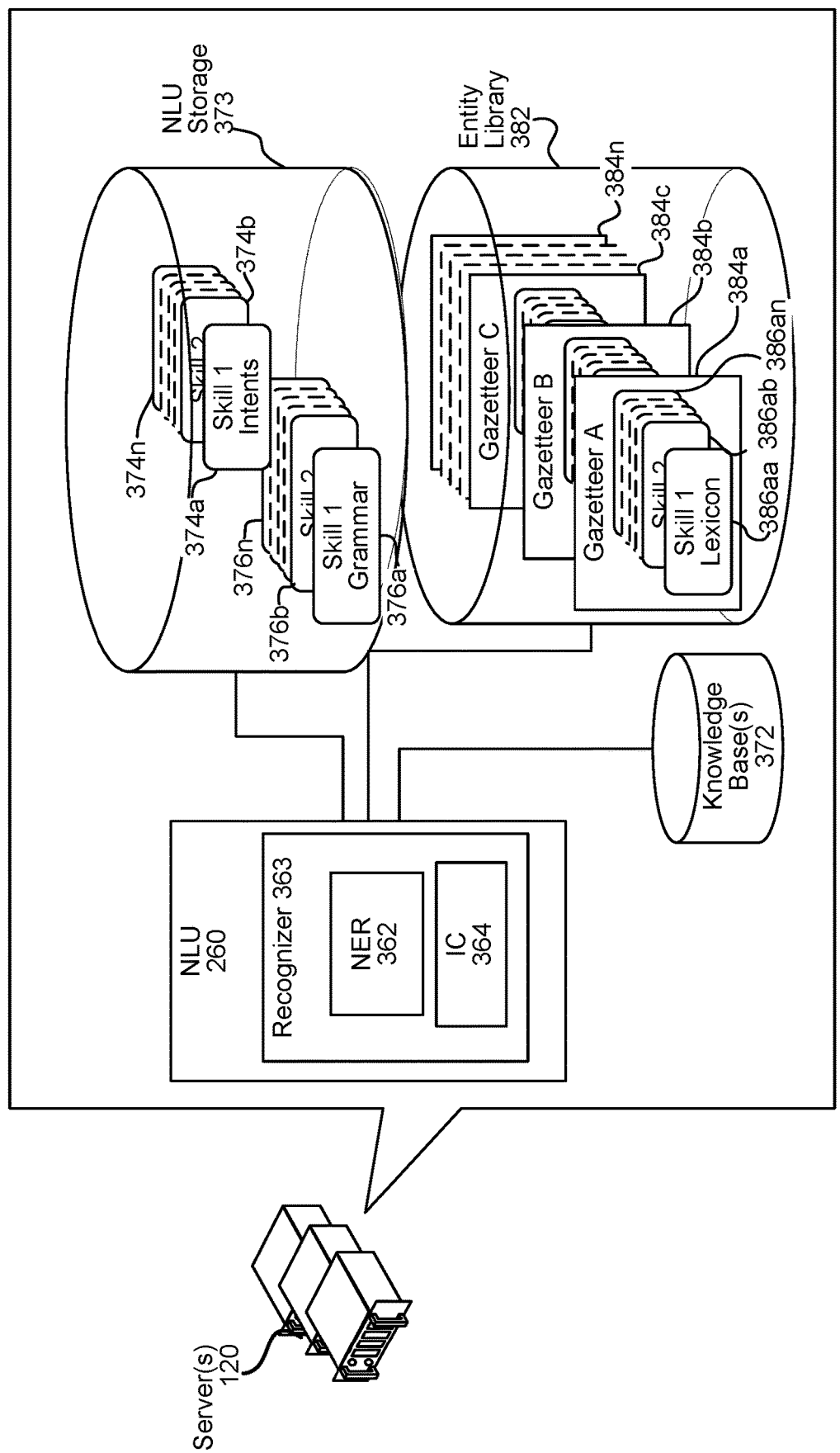
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, skill system(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. The server 120 may include an entity library 382. Each gazetteer 384 may include skill-indexed lexical information associated with a particular user and/or device 110. For example, a Gazetteer A (384*a*) includes skill-indexed lexical information 386*aa* to 386*an*. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, sender name, recipient name, entity name, sports team name, sporting event, weather condition, prescription name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. For example, a notification intent database may link words and phrases such as "tell me when," "notify me," and "let me know" to a <TellMeWhen> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. For example, a grammar framework 376 corresponding to a <TellMeWhen> intent may correspond to sentence structures such as "Remind me of { TriggerEvent} ," "Notify me of {TriggerEvent}," "Remind me of {TriggerEvent} by {Action}," "Notify me of {TriggerEvent} by {Action}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. For example, a grammar model 376 for an intent corresponding to <TellMeWhen> may specify a list of slots applicable to notify the user when the identified "event" occurs (e.g., receipt of email, prescription is ready, a particular weather condition, etc.) and any event modifiers, such as {Email Sender}, {Prescription Name}, {Rain}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. For example, an NER component 362 implemented by a notification recognizer may parse and tag text data corresponding to "notify me when I receive an email from Joe" as { Verb}: "Notify," {Object} : "email received," {Object Preposition}: "from," and {Object Modifier}: "Joe." The NER component 362 identifies "Notify" as a verb, which an IC component 364 may determine corresponds to a <TellMeWhen> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: { domain} Music, {intent}<PlayMusic>, {artist name} rolling stones, and {media type} SONG. For example, an NER component 362 may tag "Notify me when I receive an email from Joe" as: {domain} Notification, {intent}<TellMeWhen>, {trigger event} receipt of email, {action} notification, {sender name} "Joe".

FIG. 4A is a conceptual diagram of system components used to generate notification data based on a user request according to embodiments of the present disclosure.

The system(s) 120 may include the notification manager 275, a notification configuration component 410, a trigger component 420, and a user preference component 430. The notification manager 275 may receive a request to perform an action (e.g., receive an output/notification/data/information in the future, cause a device to perform an operation in the future, etc.) by the system when a particular event occurs. A user, such as the user 5 interacting with the device 110, a developer or a skill/experience creator interacting with the system(s) 120 to create/manage a skill and an application, or other types of users, may request the system(s) 120 to generate and store data that causes the system(s) 120 to perform the action when the event occurs. For example, a user may request to receive a notification, a reminder or another type of output when an event occurs (e.g., when an email is received, when a package is delivered, when a prescription is ready, when a TV show is starting, when a person is at home, etc.). As another example, a user may request the system to perform an action when an event occurs, such as, turning on the lights when someone arrives at home, adjusting the temperature at home at a particular time, etc.

The system(s) 120 may receive user input data 402 including information (e.g., trigger data indicating when an action is to be performed, action/output data indicating the output to be performed when triggered, etc.). The system(s) 120 may receive the user input data 402 from the user 5 via the device 110 as a voice input/utterance, a text input, a graphical user interface input, another form of natural language input, and/or other forms of input. The system(s) 120 may receive the user input data 402 from a skill/application developer or manager to perform an action for end-users, such as the user 5, when an event occurs. The system(s) 120 may determine (using NLU as described above) that the user input relates to an intent to receive an output or perform an action when an event occurs, and may send the user input data 402 to the notification manager 275 for further processing. The notification manager 275 may determine that the user input data 402 relates to an intent to receive a notification/output when an event occurs, and may send the user input data 402 to the notification configuration component 410.

In some embodiments, the user input data 402 may include text data representing a user request to receive an output when an event occurs. In some embodiments, the user input data 402 may include NLU data/hypothesis(es) corresponding to a user intent to receive an output when an event occurs. In some embodiments, the user input data 402 may include trigger/event information (that triggers a notification/output for the user), output information (type of output, form of output, etc.), device information (which device to provide the output), user profile information (associated with the user 5), and other data derived/parsed from the user request (which may be audio data 211, text data 213, or other type of user input).

The notification configuration component 410 may process the user input data 402 to generate notification data 440 that causes the system to perform an action in the future when a particular event occurs. The notification configuration component 410 may determine, from the user input data 402, trigger data that represents a change in state or occurrence of an event, such as, "email received", "medical prescription ready", "Seahawks are playing", "score update", "motion detected", etc. The notification configuration component 410 may determine, from the user input data 402, output data that represents an action to be performed or an output to be generated when triggered according to the trigger data. The output data may indicate that a notification is to be generated, a particular device is to be operated/controlled, etc. In some embodiments, the notification configuration component 410 may determine, from the user input data 402, metadata representing other information related to the user request, such as, trigger type, output type, delivery preference information, frequency/recurrence data, etc.

The trigger component 420 may process the trigger data and the user input data 402 to determine various other data relating to the event represented by the trigger data. The trigger component 420 may determine an event type or category corresponding to the event. For example, for trigger data "score update" or "Seahawks game start" the trigger component 420 may determine the event type to be "sports", for trigger data "email received" the trigger component 420 may determine the event type to be "correspondence", for trigger data "when it rains" the trigger component may determine the event type to be "weather", etc. In some embodiments, the trigger component 420 may determine the event type/category by understanding/parsing the trigger data using a rules engine. In some embodiments, the trigger component 420 may determine the event type/category by comparing the trigger data to other known/stored trigger data, and determining the event type/category based on that of similar trigger data. In some embodiments, the trigger component 420 may determine the event type/category using a machine learning model.

The trigger component 420 may determine an output template (which may be a generic output template, one that is widely/generally used to provide a notification) corresponding to the trigger data. The trigger component 420 may use the event type/category to determine the output template. The trigger component 420 may use stored data indicating one or more output templates corresponding to the event type/category. For example, for the event category "weather" a first output template may be: "Today's weather is <insert weather data>," a second output template may be: "Tomorrow's weather is <insert weather data>," etc. For the event category "sports" a first output template may be: "The <insert team/sporting event> is starting", a second output template may be: "There is a score update <insert score>", etc. The trigger component 420 may select one or more generic output templates based on the particular event represented by the trigger data.

The user preference component 430 may determine preference data for the user 5 requesting to receive the notification when the event occurs. The user preference component 430 may determine the preference data using data stored at the profile storage 270, which may indicate a user's preference with respect to a variety of interest areas. For example, the profile storage 270 may indicate a user's preferred sports team, favorite restaurant, close friends/contacts, etc., which may be provided by the user 5 or may be determined by the system(s) 120 based on the user's past interactions.

In some embodiments, the user preference component 430 may determine the preference data using the user's interactions with the system(s) 120 and/or skill system(s) 225. The user preference component 430 may determine that a certain number of interactions relate to a particular entity/slot value, and may determine that the user has a preference for that entity/slot value. For example, if the user purchases multiple items during different interactions with the system(s) 120/225, where the items relate to a particular sports team, then the preference data may indicate that sports team as the user's preferred sports team. In another example, if the user orders food from a particular restaurant during multiple different interactions with the system(s) 120/225, the preference data may indicate that restaurant as the user's preferred restaurant (for that cuisine type, for example).

In some embodiments, the user preference component 430 may determine the preference data using the user input data 402. In some cases, the user may indicate a preference for a particular entity/slot value when providing the request to the system(s) 120 to receive a notification when an event occurs. For example, the user request may be "tell me when my favorite team Seahawks plays," or "tell me when my favorite ABC restaurant delivers food." The user preference component 430 may derive from preference data from the user request indicating a preference for the Seahawks football team or a preference for ABC restaurant.

In some embodiments, the user preference component 430 may determine the preference data using user feedback/input provided during previous interactions. The user feedback/input may be received in response to the system(s) 120 previously providing a notification to the user when the event occurs. For example, the system(s) 120 may provide the notification: "The Seahawks game is starting now," and the user may respond "Thank you! Go Hawks!" Using this user feedback/input/response to the notification (previously outputted by the system(s) 120), the user preference component 430 may determine the preference data to indicate a preference for the Seahawks football team. The user feedback to previously provided notifications/outputs when a particular event occurs may be received in various forms, for example, an utterance, a voice input, a touch screen input, selection of a user interface element, facial expression(s) captured by a camera of the device 110, etc. The user feedback may also be determined by the system(s) 120 based on a negative response or a non-response from the user, or other sounds made by the user indicating a positive or negative response/feedback.

The user preference component 430 may determine preference data corresponding to the trigger data/event type. For example, if the trigger data corresponds to a "sports" event type, and more specifically corresponding to a particular sports (e.g., football), then the user preference component 430 may determine preference data indicating the user's preference with respect to sports, in particular the user's preferred/favorite football team. In another example, if the trigger data corresponds to a TV show, then the user preference component 430 may determine preference data indicating the user's preference with respect to TV shows. Thus, the preference data relates to the event represented by the trigger data.

The user preference component 430 may determine one or more entities/slot values corresponding to the event represented by the trigger data, and may determine preference data to indicate the user's preference towards at least one of the entities. For example, if the user request is "tell me when the Seahawks game starts," the user preference component 430 may determine that the entities relating to this event are Seahawks football team and Patriots football team (the opposing team in the particular game), and may determine preference data indicating a preference for either the Seahawks football team or the Patriots football team.

The user preference component 430 may determine the preference data using a rule engine to parse/understand various data related to the user. The user preference component 430 my determine the preference data using a machine learning model that may process user profile data, user past interactions data, user feedback data, and other data that may be used to determine the user's preferences.

The notification configuration component 410 determines the notification data 440 using the trigger data, the generic output templates determined by the trigger component 420 and the preference data determined by the user preference component 430. The notification data 440 may include the trigger data indicating an event occurrence of which triggers an output/notification with respect to a user profile. The notification data 440 may also include a user profile identifier identifying the user profile (associated with the user 5) that is to receive the output/notification. The notification data 440 may also include a customized output/notification template, which may be determined by the notification configuration component 440 as described in detail below. The notification data 450 may include one or more device identifier(s) to identify which device(s) is to receive the output/notification when the event occurs. The notification configuration component 440 may store the notification data 440 in the notification storage 285.

The notification configuration component 410 determines a customized notification template using the preference data, the trigger data, the event type, and/or other data relating to the user 5 or the event occurrence. As used herein, a notification template (generic or customized) may refer to structured data that a NLG component (e.g., output generation component 450) can process to generate a natural language sentence/phrase/output. The notification template may include a combination of phrases/words that are to be included in the natural language output and placeholders where certain data is to be inserted. The placeholders may indicate the type of data to be inserted. The placeholders may also indicate any emphasis or sentiment that is to be applied to the indicated portion when generating synthesized speech using TTS processing. The output generation component 450 (described with relation to FIG. 4B), using NLG techniques, may replace the placeholders in the notification template with data (e.g., text data) that is to be presented to the user.

The notification configuration component 410 may determine a portion of the notification template using the generic notification template that may indicate how the occurrence of the event is to be presented to the user. For example, for presenting weather information, the generic notification template may be: "The current weather is <insert weather data>" or "Today's weather is <insert weather data>." In another example, for presenting sports score updates the generic notification template may be: "The current score in the <insert sports event> is: <insert score>." The notification configuration component 410 may determine another portion of the notification template using customized phrases/ templates that may indicate how preference data can be used to customize the notification for particular events/interactions. For example, a customized portion for a sports event may be: "Go <insert user team preference; use emphasis>!" or "Boooo <opposing team; use sad tone>". In another example, a customized portion for the first user interaction of the day may be: "Hi<insert user name>"

The notification configuration component 410 may determine a customized notification template using stored data indicating different portions of the templates corresponding to different events/event types, different preference data, different interaction context, etc. The notification configuration component 410 may determine the customized notification template by combining the above described generic notification (to present information about the event occurrence) and the above described customized portions (to present customizations based on user preferences, event-related information, interaction context, etc.).

In some embodiments, the notification configuration component 410 may determine the customized notification template using one or more generic notification templates (provided by the content source(s) 126, the skill system(s) 225 or other system(s)/component(s)). The notification configuration component 410 may modify the generic notification template in various ways to determine the customized notification template.

In some embodiments, the notification configuration component 410 may add information to the generic notification template, where the added information is not the event data/content, but may relate to the event data/content. For example, if the generic notification template is "The weather today is <insert weather data>", the customized notification template may be "The weather today is <insert weather data>. Remember to take <insert weather-specific item>." During execution, the output generation component 450 may determine a weather-specific item (e.g., "an umbrella" if it is raining, "a coat" if it is cold, "a hat" if it is sunny, etc.).

In some embodiments, the notification configuration component 410 may add information to the generic notification template, where the added information does not relate to the event data/content, but rather relates to the user, the particular interaction, context information relating to the interaction or the event occurrence, etc. For example, if this is the first interaction of the day between the system(s) 120 and the user 5, then the customized notification template may include certain pleasantries, such as, "good morning <insert user's name>," good afternoon <insert user's name>," "hello <insert user's name>" etc. Thus, a customized notification template may be "<Insert time-of-day specific greeting><insert user's name>. The <sports event> is starting." During execution, the output generation component 450 may determine time-of-day specific greeting based on the time the interaction takes place, for example, if the interaction/notification is provided in the morning then the output generation component 450 determines the greeting to be "good morning," if the interaction is in the afternoon then the greeting is "good afternoon."

In some embodiments, the notification configuration component 410 may determine the customized notification template using the preference data corresponding to the user profile and the event/event type. For example, if the event is a sports event, then the user preference component 430 may determine preference data indicating the user's sports team preference for the particular sports event. The notification configuration component 410 may determine the customized notification template to be "The <sports event> is starting. Go <insert user's preferred team; use excited emphasis/ voice>!."

In some embodiments, the notification configuration component 410 may determine the customized notification template using the user input data 402. In some cases, the user may indicate a custom message/reminder/notification that the user wants to receive when the event occurs. For example, the user request may be: "remind me to close the windows when it rains", or "tell me to adjust the thermostat before I leave for work." The notification configuration component 410 may determine, using the user input data 402, that the user request includes a custom notification, and may determine the customized notification template using the custom notification. In these examples, a customized notification template may be: "It is <insert weather condition.> Remember to close the windows" or "Remember to adjust the thermostat before leaving."

In some embodiments, the customized notification template may include specific phrases/words describing occurrence of the event if specifics of the event are already known when the user registers to receive a notification of the event occurrence. In some cases, the event specifics are not known until after the event occurs, and the customized notification template may include placeholders to fill in the event specifics. For example, if the user requests to receive a notification when it starts raining, then the customized notification template may be "it is raining" (instead of "it is <insert weather condition>" because the event specifics are already known. In another example, if the user requests to receive a notification when the Seahawks game starts, then the customized notification template may be "the Seahawks game is starting" (instead of "the <insert sports event> is starting." In another example, if the user requests to receive a notification when there is a score change/update during the Seahawks game and the notification is to include the current score, then the event specifics are not known yet and the customized notification template may be "there is score update. <insert current score>."

The notification configuration component 410 may determine different notification templates for different users requesting to receive a notification when the same event occurs. For example, a first user may request to receive a notification when the Seahawks game starts, and the notification configuration component 410 may determine a first customized notification template for the user request. A second user may also request to receive a notification when the Seahawks game starts, and the notification configuration component 410 may determine a second customized notification template for the user request. The first notification template may be customized using preference data associated with the first user indicating a preference for the Seahawks team. The second notification template may be customized using preference data associated with the second user indicating a preference for another team/opposing team.

The notification configuration component 410 may determine different notification templates for a single user request, depending on the preference data, the trigger data, the event type, and other data. For example, for the user request: "tell me when there is score change in the Seahawks game," the notification configuration component 410 may determine a first notification template to be used when the Seahawks team are winning and a second notification template to be used when the Seahawks team are losing. The notification configuration component 410 may determine these two example notification templates based on the preference data indicating a user's preference for the Seahawks football team. The first notification template may be: "There is a score update: <score data>. Go Hawks!" and the second notification template may be: "There is a score update: <score data>. Booo <opposing team>." Thus, the notification configuration component 410 may determine customized notification templates by adding information to the notification related to the user's preferences.

In some embodiments, when the notification is to be provided as synthesized speech, the notification configuration component 410 may indicate in the customized notification templates portions of the notification that are to be emphasized in a particular way. For example, a notification template may be: "The Seahawks game is starting!<use excited speech/voice>" or "The Seahawks are losing. <use sad tone in speech/voice>."

The notification storage 285 may store notification data 440 corresponding to different user requests to receive notifications when different events occur. The notification storage 285 may store notification data 440 corresponding to user requests from a user 5 to receive notifications/outputs when various different events occur. The notification storage 285 may store notification data 440 corresponding to user requests from multiple users to receive notifications/outputs when various different events occur. One instance of notification data 440 may correspond to one user request to receive a notification when one particular event occurs. One instance of notification data 440 may include a user profile identifier, trigger data, and one or more notification templates (customized for the user).

In some embodiments, the notification configuration component 410 may determine filter data and entity values corresponding to the notification by processing the user input data 402. The filter data and the entity values may be stored as the notification data 450. The filter data may represent data or information that can be used to identify the triggering event for the notification. The entity value may indicate one or more entities associated with the triggering event. For example, if the user input is "tell me I receive an email from Joe", the filter data may include an email address associated with Joe and the entity value may include "Joe." So that when an email from Joe is received, the notification manager 275 may use the email address and the entity value "Joe" to recognize that a notification is to be generated when this event occurs. As another example, if the user input is "notify me when my Asthma prescription is ready," the filter data may a user identifier associated with the user's medical information/prescription, and the entity value may be "Asthma." As another example, if the user input is "remind me when the Seahawks play," the filter data may be a TV program identifier associated with the football game and the entity value may be "Seahawks."

In some embodiments, the system(s) 120 may generate an output confirming creation of the notification data causing the system to provide a notification to the user in the future. The notification manager 275 may generate an output that includes information related to how the output/notification will be provided to the user. The confirmation output may be based on and/or may include the output type, the trigger data, the output data, the output device, etc. For example, the notification manager 275 may present the following confirmation output: "I will notify you when you receive an email from Joe" or "I will tell you when the Seahawks game starts." The confirmation output may be generated using NLG techniques, where the structured data representing at least one of the output type, the trigger data, the output data and the output device may be converted to a natural language output corresponding to the confirmation output. In some embodiments, the natural language output may be text data that may be sent to the TTS component 280 to generate audio data representing synthesized speech as described in connection with FIGS. 7A and 7B.

The confirmation output generated by the notification manager 275 may be provided to the orchestrator 230 for output to the device 110. The confirmation output may be processed by the TTS component 280 to generate synthesized speech if the device 110 that received the user request to receive a notification is capable of outputting synthesized speech and/or audio data. The confirmation output may be displayed as text data or in another form at the device 110 that received the user request to receive a notification.

The system(s) 120 may receive a user input in response to the system presenting the confirmation of presenting a notification when an event occurs, where the user input may indicate a change to the notification output. For example, if the system presents the confirmation "I will announce it when you receive an email from Joe," the user may respond "No, send me a notification on my phone instead" or the user may provide input in another form (e.g., text, selection of option via a graphical user interface, etc.) indicating that the user wants to receive a notification on a mobile device instead of the announcement. The notification manager 275 then updates the corresponding notification data 440 accordingly to indicate an output type of push notification and a device identifier corresponding to the user's mobile device.

Figure 4B:
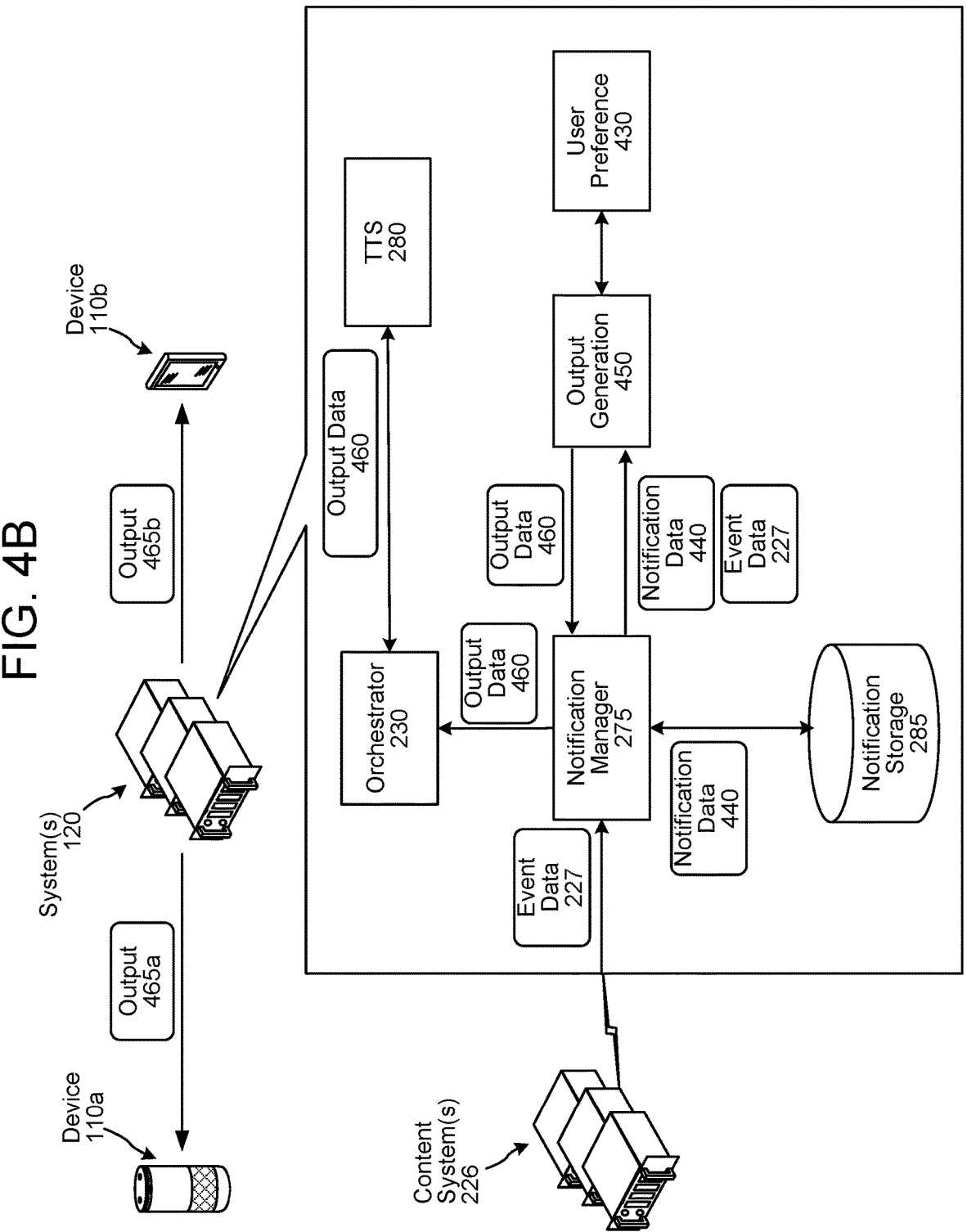
FIG. 4B is a conceptual diagram of a notification manager to generate a custom output when an event occurs according to embodiments of the present disclosure.

FIG. 4B is a conceptual diagram of system components used to generate a custom output when an event occurs according to embodiments of the present disclosure. In some embodiments, the content system(s) 126 may provide the event data 227 to the notification manager 275 (directly or via the orchestrator 230). In some embodiments, a skill component 290 may provide event data to the notification manager 275 (directly or via the orchestrator 230). The event data 227 may indicate occurrence of an event, such as, starting of a game, occurrence of a weather condition, score change/update in a football game, etc. The notification manager 275 may retrieve notification data 440 from the notification storage 455 and determine that the event data 227 triggers an output/notification with respect to a user profile and/or via a device 110.

The notification manager 275 may send the notification data 440 and the event data 227 to the output generation component 450. The output generation component 450 may be configured to determine the content of the notification/output triggered by the event occurrence. The output generation component 450 may use the notification data 440 that includes the customized notification template(s), the event data 227 and user preference data to determine the content of the notification. The output generation component 450 may generate output data 460 representing, in some embodiments, the content of the notification. In some embodiments, the output generation component 450 may employ NLG techniques to determine a natural language output describing the event occurrence and including certain customizations as described herein.

Prior to selecting a customized notification template and generating the output data 460, the output generation component 450 may determine preference data using the user preference component 430 (as described above). At this point, the system(s) 120 may determine the preference data using updated/more recent interactions data, user preferences data, etc., thus to ensure that the user's preferences have not changed since the user registered to receive the notification when the event occurs. For example, when the user requests to receive a notification when the Seahawks game starts, the user's preferred team may be Seahawks (as indicated by the preference data). However, when the event occurs—the Seahawks game starts—the user's preferred team may have changed, for example, to Patriots, which the user preference component 430 may determine by analyzing the users interactions data, user profile data, user preferences, user feedback/input, etc. Using the updated preference data, the output generation component 450 may determine which customized notification template to use, and what content to present to the user in the notification.

In some cases, the output generation component 450 may not request the user preference component 430 to determine updated preference data, for example, when a particular amount of time has not passed between when the user requests to receive the notification and when the event occurs. The output generation component 450 may determine that the duration of time is not large enough (does not exceed a threshold, does not satisfy a condition, etc.) for the user to have updated his preference. In other cases, the output generation component 450 may not request the user preference component 430 to determine updated preference data, for example, when no new information, interactions, inputs, etc. are provided by the user between when the user requests to receive the notification and when the event occurs.

As described above, the notification data 440 may include more than one customized notification template that can be used to determine the content of the notification. The output generation component 450 may select one of the customized notification templates based on the specifics of the event, event context data, event content data, the preference data, interaction context data, and other data.

After selecting a customized notification template for the particular interaction, the output generation component 450 may fill in the template using the event data 227, the preference data and other interaction context data.

The output data 460 may include data (e.g., text data) representing the content/information to be presented to the user. In some embodiments, the output data 460 may include data representing the action to be performed. The output data 460 may also include a device identifier associated with the output device 110a/110b that is to receive the output data. The output data 460 may also include the output type (e.g., TTS, push notification, audio, visual, etc.) for how the output is to be presented to the user.

The notification manager 275 may send the output data 460 to the orchestrator 230 for further processing so that the output can be presented to the user in response to the notification being triggered. The system(s) 120, using one or more components described in connection with FIG. 2, may determine the output 465 to send to the device 110 for presentation to the user. For example, the output data 460 may indicate that audio data including synthesized speech is to be sent to a smart speaker device associated with the user profile, the orchestrator 230 may send the output data 460 to the TTS component 280 to determine audio data representing synthesized speech, and the system(s) 120 may send the output 465a including the audio data to the device 110a. In another example, the output data 460 may indicate that a push notification is to be sent to a mobile device associated with the user profile, and the system(s) 120 may send the output 465b including notification data to the device 110b. In another example, the output data 460 may indicate that a visual indication is be sent to a smart speaker device associated with the user profile, and the system(s) 120 may send the output 465a including an instruction to present the visual indication (e.g., a yellow light ring) via the device 110a.

In some embodiments, the output generation component 450 may determine which device associated with the user profile is to receive the notification/output when the event occurs. In other words, the output generation component 450 may select the output device for the notification. In some cases, an output device may be a voice-enabled device, may be configured to perform spoken language understanding, and may be capable of outputting synthesized speech. In other cases, an output device (e.g., a mobile device) may include a voice-enabled application that is capable of performing spoken language understanding using a user input, but not capable of outputting synthesized speech. In some cases, the output device may be capable of presenting push notifications. In some cases, the output device may be capable of outputting one or more output types, such as, synthesized speech, audio data, video data, visual output, a colored light (e.g., yellow light ring, blue blinking light, etc.), a sound (e.g., a chime, a beeping sound, etc.), a graphical icon, email message, SMS message, voice message, and other types of outputs.

The output generation component 450 may present a notification (e.g., a displayed text notification or an announcement via synthesized speech/audio data) that includes the content determined using the customized notification template, and may also present another type of output in addition to the notification. In some embodiments, the output generation component 450 may determine to present an output other than a notification (e.g., video data, visual data, audio data, visual output, etc.). The output generation component 450 may determine to present an additional type of output or an output other than a notification based on the event context or interaction context.

The event context may include the specifics/content of the event, the time the event occurs, the type of event, any priority information associated with the event, other data provided by the content sources 226/skill systems 225/event data provider, and other information related to occurrence of the event. For example, if the occurred event is a severe weather alert, the output generation component 450 may determine that the associated priority is high, and may determine to present a notification in the form of an announcement and display information related to the severe weather alert on one or more devices to ensure that the user receives information related to the event occurrence. In another example, if the occurred event is motion detected at the front door, the output generation component 450 may determine to only present a notification. In another example, if the occurred event is a person detected at the front door, the output generation component 450 may determine to present a notification and video data/feed from an image capture device at the door showing the detected person. In another example, if the occurred event is a doorbell, the output generation component 450 may present a notification and a particular sound, like a chime.

The interaction context may refer to context when the notification/output is to be provided to the user. The interaction context may include the time of the interaction, user presence data, device type, state of the output device(s) (e.g., active, turned off, sleep mode, etc.), and other data.

The output generation component 450 may determine the type of output based on an output device's capabilities. The output generation component 450 may determine which devices to provide the output based on the device's capabilities. For example, if the output generation component 450 determines to provide video data, then the output generation component 450 may select a device associated with the user profile that is capable of presenting video data.

The output generation component 450 may determine a set of devices associated with the user profile that are to receive a notification/output when the event occurs, and the form of output each device is to receive. For example, the output generation component 450 may determine the potential output devices and their respective output form to be a smart speaker device 110*a*: TTS output, a smart phone 110*b*: push notification, smart watch 110*c*: visual/light notification, display device 110*f*: TTS output and visual notification, etc. When executing the notification manager 275 may determine which devices of the potential output devices may receive the output. In some cases, all of the potential output devices may receive the output, and in some cases only one of the potential devices may receive the output. The notification manager 275 may use various factors to make this determination, including, but not limited to, presence data (indicating the user is proximate to one or more device at the time the output is to be presented), location data (indicating the user's location (e.g., home versus work)), interaction data (indicating the user is interacting with a particular device when the output is to be presented), and other factors. These factors may indicate that the user is more likely to receive/view/access the output if presented at the particular device.

The output generation component 450 may determine an output type which may indicate which form(s) of output (e.g., announcement, push notification, visual notification, audio notification, etc.) are to be used to indicate to the user that the triggering event occurred. The output type may also indicate the timing of presenting the output (e.g., interrupt the user with the output as soon as the event occurs, wait till the user interacts with the system, present a silent notification, etc.). The output type may also indicate how many devices associated with the user profile are to receive the output.

The output generation component 450 may determine which device(s) to send the output to when triggered, the type/form of the output, and other information related to presenting the output to the user. For example, a developer may specify that a notification/output for a particular event occurrence is to be presented as a push notification, rather than an audio output/announcement. As another example, a system preference may specify that a particular notification/output cannot be presented via a device that is associated with a child user or that is designated as a child's device (by the user, the manufacturer, the system, etc.).

Figure 5:
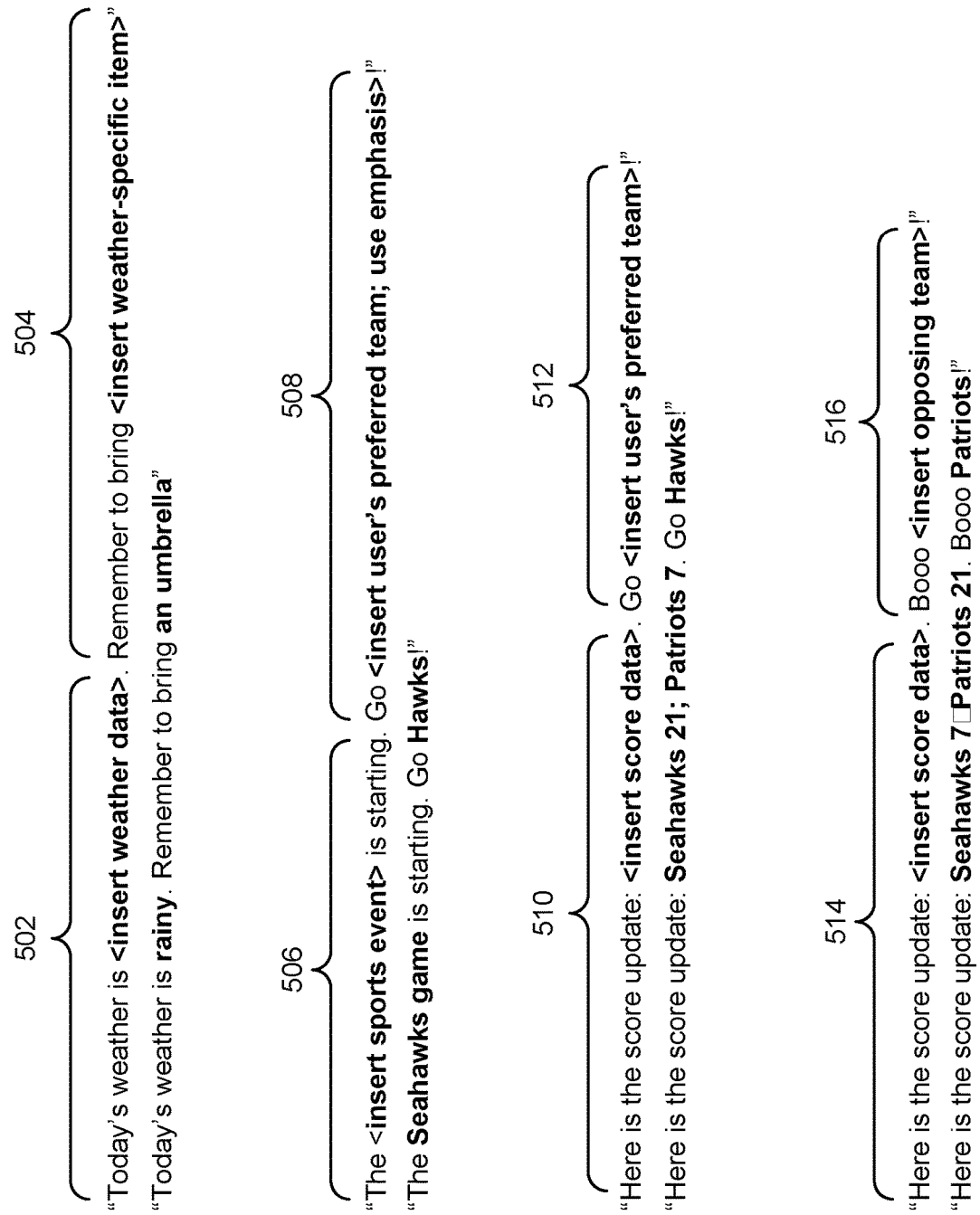
FIG. 5 illustrates example customized notification templates having a portion based on event occurrence and a portion based on other data according to embodiments of the present disclosure.
Figure 6:
FIG. 6 is a schematic diagram of an illustrative architecture in which sensor data is combined to recognize one or more users according to embodiments of the present disclosure.

FIG. 5 illustrates example customized notification templates having a portion based on event occurrence and a portion based on other data according to embodiments of the present disclosure. FIG. 5 also illustrates example content determined by the system(s) 120 using the customized notification templates. As shown, a first example notification template may include a first portion 502 describing occurrence of the weather event and a second portion 504 relating to the weather-specific event. As shown, the system(s) 120 may determine the notification content to be "Today's weather is rainy. Remember to bring an umbrella." A second example notification template may include a first portion 506 describing start of a sports event and a second portion 508 relating to the user preferences. As shown, the system(s) 120 may determine the notification content to be "The Seahawks game is starting. Go Hawks!" A third example notification template may include a first portion 510 describing a score update and a second portion 512 relating to the user preference and event content. As shown, the system(s) 120 may determine the notification content to be "Here is the score update: Seahawks 21, Patriots 7. Go Hawks!" A fourth example notification template may include a first portion 514 describing a score update and a second portion 516 relating to the user preference and event content. As shown, the system(s) 120 may determine the notification content to be "Here is the score update: Seahawks 7, Patriots 21. Boooo Patriots!" Thus, the system(s) 120 determines, in some cases, a portion of the notification content using the user preferences and the event content, as shown by portions 512 and 516 (where portion 512 is based on the user's preferred team winning as indicated by the score update, and portion 516 is based on the user's preferred team losing as indicated by the score update). Although portions of the output describing the event occurrence is shown as appearing first/before the customized portions, it should be understood that the portions describing the event The system(s) 120 may include a user recognition component 295 that recognizes one or more users using a variety of data. As illustrated in FIG. 6, the user recognition component 295 may include one or more subcomponents including a vision component 608, an audio component 610, a biometric component 612, a radio frequency (RF) component 614, a machine learning (ML) component 616, and a recognition confidence component 618. In some instances, the user recognition component 295 may monitor data and determinations from one or more subcomponents to determine an identity of one or more users associated with data input to the system(s) 120. The user recognition component 295 may output user recognition data 695, which may include a user identifier associated with a user the user recognition component 295 believes originated data input to the system(s) 120. The user recognition data 695 may be used to inform processes performed by various components of the system(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may utilize determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the system(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of the system(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the system(s) 120 for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the device 110 that captured the spoken user input).

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 7A:
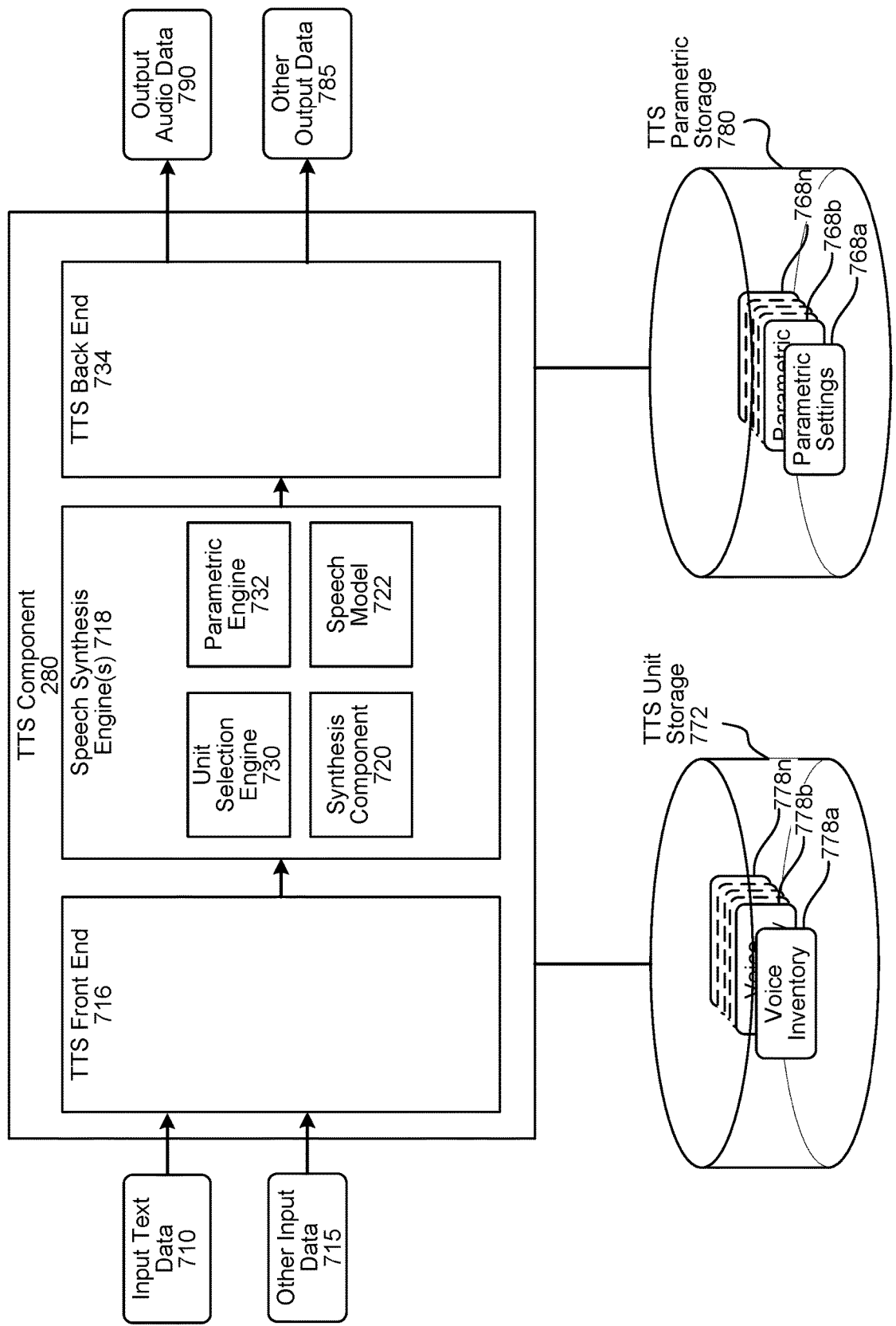
FIG. 7A is a conceptual diagram of text-to-speech components according to embodiments of the present disclosure.

Components of a system that may be used to perform unit selection, parametric TTS processing, and/or model-based audio synthesis are shown in FIG. 7A. As shown in FIG. 7A, the TTS component/processor 280 may include a TTS front end 716, a speech synthesis engine 718, TTS unit storage 772, TTS parametric storage 780, and a TTS back end 734. The TTS unit storage 772 may include, among other things, voice inventories 778a-288n that may include pre-recorded audio segments (called units) to be used by the unit selection engine 730 when performing unit selection synthesis as described below. The TTS parametric storage 780 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source such as output data 460 created by output generation component 450 and sent to TTS 280 by the orchestrator 230) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The output generation component 450 may include tags in output data 460 (that may be the input text data 710/other input data 715) indicating when text should be presented in an excited manner based on the preference data. For example, if the user is a fan of the Seahawks team and the team is winning, then the output data 460 may include the following text data and tags: "The score is Patriots 7, Seahawks 21. <begin excited tone> G Hawks!<end excited tone>." In another example, if the user is a fan of the Seahawks teams and the team is losing, then the output data 460 may include the following text data and tags: "The score is Patriots 7, Seahawks 3. <begin upset tone> Booo Patriots <end upset tone>." The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 280, within the memory and/or storage of the server 120, device 110, or within an external device.

Text data 710 input into the TTS component 280 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778*a-n*). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short. wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 790 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 280 based on feedback of the results of TTS processing, thus enabling the TTS component 280 to improve speech recognition.

The TTS storage component 280 may be customized for an individual user based on his/her individualized desired speech output. In particular, the speech unit stored in a unit database may be taken from input audio data of the user speaking. For example, to create the customized speech output of the system, the system may be configured with multiple voice inventories 778*a*-278*n*, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 720 may process the audio data for that unit to create a modified unit audio data. The modified unit audio data may then be concatenated to form the output audio data 790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 785 may be output along with the output audio data 790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 790 may include other output data 785 that may include a prosody tag or other indicator that instructs the device 110 to slow down the playback of the output audio data 790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

Figure 7B:
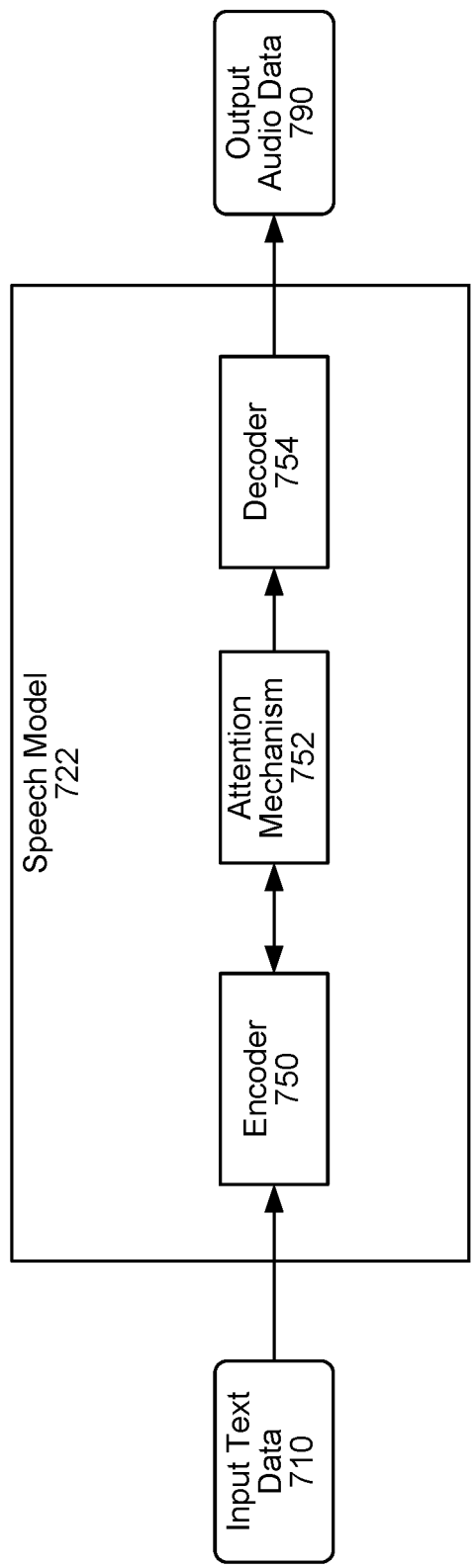
FIG. 7B is a conceptual diagram of a speech model according to embodiments of the present disclosure.

FIG. 7B illustrates an embodiment of the speech model 722. The speech model may include an encoder 750, attention mechanism 752, and a decoder 754. This arrangement of components may be referred to as a sequence-to-sequence model. The encoder 750 and/or decoder 754 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

As descried herein, the interaction determination component 296 determines an interaction score 760. The encoder 750 may receive this interaction score 760, as well as input text data 710 corresponding to input data from the device 110 and/or the NLU result data 685. The encoder 750 may encode this information into a context vector, which is input to the decoder 754. Optionally, an attention mechanism 752 may receive this context vector as well as outputs of other nodes of the encoder 750 and weight (e.g., "attend") different outputs of the encoder 750 differently. The decoder 754 may then generate output audio data 790 (which may include the response data) using the context vector and/or output of the attention mechanism 752.

Figure 8:
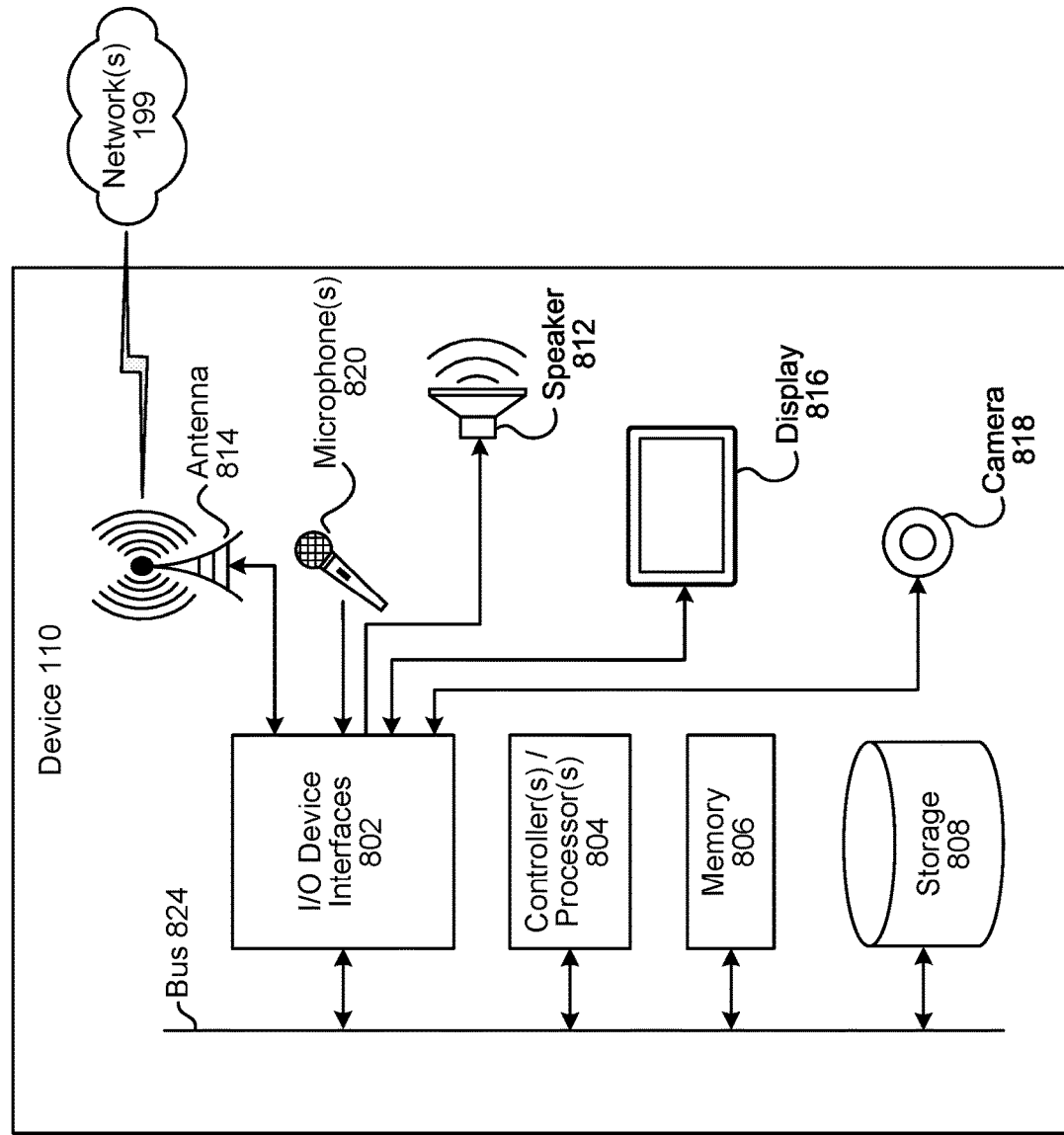
FIG. 8 is a block diagram conceptually illustrating example components of a device according to embodiments of the present disclosure.
Figure 9:
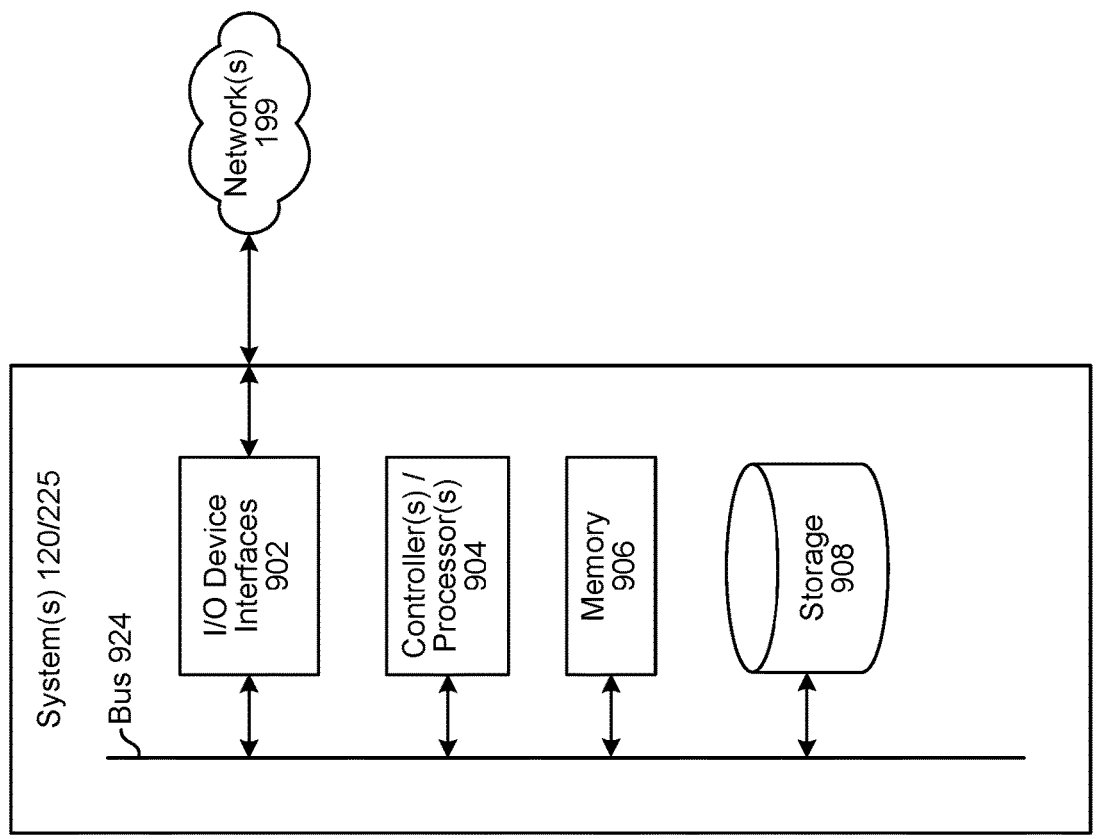
FIG. 9 is a block diagram conceptually illustrating example components of a system according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (802/902), processor(s) (804/904), memory (806/906), and/or storage (808/908) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10:
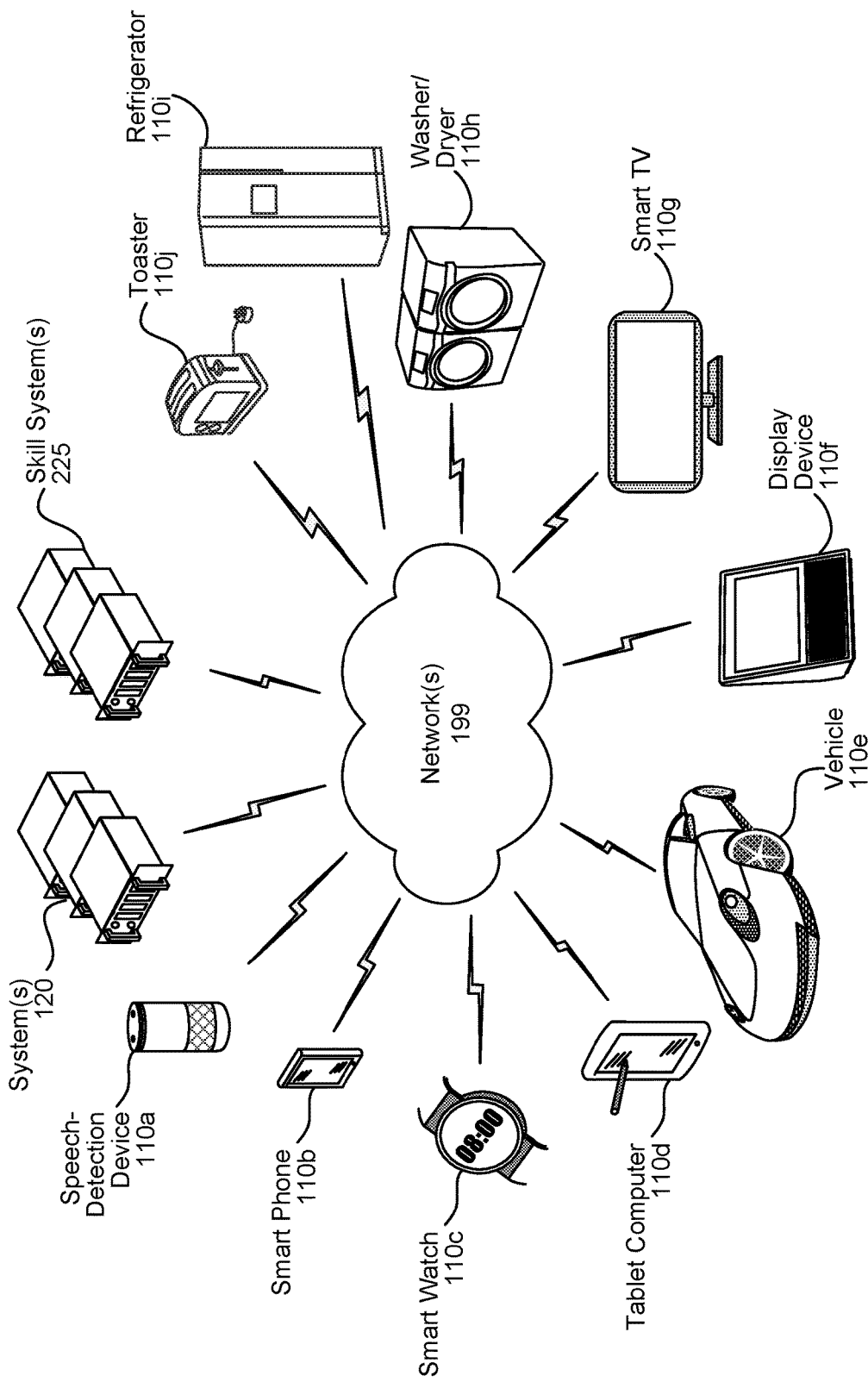
FIG. 10 illustrates an example of a computer network for use with the speech processing system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input data representing a natural language input, the input data associated with a first user profile;
processing the input data using a natural language understanding (NLU) component to determine an intent to receive a first notification when an event occurs, the NLU component including at least one machine learned model;
determining, using the input data, first trigger data representing the event;
receiving event data indicating occurrence of the event;
determining, using the first trigger data, that the event data triggers the first notification with respect to the first user profile;
determining first preference data corresponding to the first user profile;
determining a first notification template using the first trigger data and the first preference data;
determining first output data using the first notification template and the event data;
determining to emphasize a portion of the first output data based at least in part on the first preference data;
processing, using text-to-speech (TTS) processing, the first output data to determine first output audio data, a portion of the first output audio data corresponding to the portion of the first output data being emphasized;
determining an output type corresponding to the first notification template;
determining a device output capability corresponding to the output type; determining a first device associated with the first user profile has the device output capability;
causing the first device to present the first output audio data;
determining, using second trigger data, that the event data triggers a second notification with respect to a second user profile using a second notification template;
determining second output data using a second notification template and the event data; and
causing a second device associated with the second user profile to present an output corresponding to the second output data.

2. The computer-implemented method of claim 1, further comprising:
determining the first preference data using at least one of:
(i) the input data, wherein the input data indicates a preference for an entity corresponding to the event;
(ii) the first user profile, wherein the first user profile indicates a preference for an entity corresponding to the event; or
(iii) past interactions data corresponding to the first user profile, the past interactions data indicating a preference for an entity corresponding to the event.

3. The computer-implemented method of claim 1, further comprising:
processing, using TTS processing, the second output data to determine second output audio data; and
sending the second output audio data to the second device.

4. The computer-implemented method of claim 1, further comprising:
determining an event type using the event data;
determining, based at least on the event type and the device output capability, second output data corresponding to the event; and
sending the second output data to the first device.

5. The computer-implemented method of claim 1, further comprising:
determining first past interactions data corresponding to the first user profile, the first past interactions data representing first interactions during a first time period;
determining the first preference data using the first past interactions data indicating a preference for a first entity corresponding to the event;
determining second past interactions data corresponding to the first user profile, the second past interactions data representing second interactions during a third time period subsequent to the first time period;
determining second preference data using the second past interactions data indicating a preference for a second entity corresponding to the event; and
determining, using the first notification template and the second preference data, second output data corresponding to second event data.

6. The computer-implemented method of claim 1, further comprising:
determining, using the first trigger data and the first preference data, a second notification template corresponding to the first notification;
associating the second notification template with the first trigger data and the first user profile;
determining event context data representing information related to occurrence of the event; and
determining, based at least in part on the event context data, to select the second notification template for generating the first notification.

7. The computer-implemented method of claim 1, further comprising:
determining, using the input data, text data corresponding to data to be included in the first notification, wherein determining the first notification template comprises determining the first notification template to include at least the text data.

8. The computer-implemented method of claim 1, further comprising:
determining a phrase template using content of the event data and the first preference data; and
determining, using the event data, at least one word to fill in the phrase template, wherein determining the first output data additionally includes using the at least one word.

9. The computer-implemented method of claim 1, further comprising:
determining that the device output capability includes a display;
determining image data using one or more of the first notification template or the event data; and
sending the image data to the first device.

10. The computer-implemented method of claim 1, further comprising:
determining, prior to receiving the event data, a third notification template corresponding to the first notification;
associating the third notification template with the first trigger data and the first user profile;
determining, after receiving the event data, event content data representing information relating to occurrence of the event;
selecting, based at least in part on the event content data, the first notification template, rather than the third notification template, for generating the first notification; and determining to emphasize the portion of the first output data based on the event content data, wherein processing the first output data to determine the first output audio data comprises processing the first output data to determine the portion of the first output audio data corresponding to the portion of the first output data being emphasized.

11. A system comprising:
at least one processor; and
at least one memory including instructions that, when executed by the at least one processor, cause the system to:
receive input data representing a natural language input, the input data associated with a first user profile;
process the input data using a natural language understanding (NLU) component to determine an intent to receive a first notification when an event occurs, the NLU component including at least one machine learned model;
determine, using the input data, first trigger data representing the event;
receive event data indicating occurrence of the event;
determine, using the first trigger data, that the event data triggers the first notification with respect to the first user profile;
determine first preference data corresponding to the first user profile;
determine a first notification template using the first trigger data and the first preference data;
determine first output data using the first notification template and the event data;
determine to emphasize a portion of the first output data based at least in part on the first preference data;
determine an output type corresponding to the first notification template;
processing, using TTS processing, the first output data to determine first output audio data, a portion of the first output audio data corresponding to the portion of the first output data being emphasized;
determine a device output capability corresponding to the output type;
determine a first device associated with the first user profile has the device output capability, the first user profile associated with at least a second device;
in response to determining that the first device has the device output capability, cause the first device to present the first output audio data;
determine, using second trigger data, that the event data triggers a second notification with respect to a second user profile using a second notification template;
determine second output data using a second notification template and the event data; and
causing a second device associated with the second user profile to present an output corresponding to the second output data.

12. The system of claim 11, wherein the instructions that, when executed by the at least one processor, further cause the system to:
determine the first preference data using at least one of:
(i) the input data, wherein the input data indicates a preference for an entity corresponding to the event;
(ii) the first user profile, wherein the first user profile indicates a preference for an entity corresponding to the event; or
(iii) past interactions data corresponding to the first user profile, the past interactions data indicating a preference for an entity corresponding to the event.

13. The system of claim 11, wherein the instructions that, when executed by the at least one processor, further causes the system to:
process, using TTS processing, the second output data to determine second output audio data; and
send the second output audio data to the second device.

14. The system of claim 11, wherein the instructions that, when executed by the at least one processor, further causes the system to:
determine an event type using the event data;
determine, based at least on the event type and the device output capability, second output data corresponding to the event; and
send the second output data to the first device.

15. The system of claim 11, wherein the instructions that, when executed by the at least one processor, further cause the system to:
determine first past interactions data corresponding to the first user profile, the first past interactions data representing first interactions during a first time period;
determine the first preference data using the first past interactions data indicating a preference for a first entity corresponding to the event;
determine second past interactions data corresponding to the first user profile, the second past interactions data representing second interactions during a third time period subsequent to the first time period;
determine second preference data using the second past interactions data indicating a preference for a second entity corresponding to the event; and
determine, using the first notification template and the second preference data, second output data corresponding to second event data.

16. The system of claim 11, wherein the instructions that, when executed by the at least one processor, further cause the system to:
determine, using the first trigger data and the first preference data, a second notification template corresponding to the first notification;
associate the second notification template with the first trigger data and the first user profile;
determine event context data representing information related to occurrence of the event; and
determine, based at least in part on the event context data, to select the second notification template for generating the first notification.

17. The system of claim 11, wherein the instructions that, when executed by the at least one processor, further cause the system to:
determine, using the input data, text data corresponding to data to be included in the first notification, wherein the instructions that cause the system to determine the first notification template further causes the system to determine the first notification template to include at least the text data.

18. The system of claim 11, wherein the instructions that, when executed by the at least one processor, further cause the system to:
determine a phrase template using content of the event data and the first preference data; and
determine, using the event data, at least one word to fill in the phrase template, wherein determining the first output data additionally includes using the at least one word.

19. The system of claim 11, wherein the instructions that, when executed by the at least one processor, further cause the system to:
- determine that the device output capability includes a display;
- determine image data using one or more of the first notification template or the event data; and
- send the image data to the first device.

20. The system of claim 11, wherein the instructions that, when executed by the at least one processor, further cause the system to:
- determine, prior to receiving the event data, a third notification template corresponding to the first notification;
- associate the third notification template with the first trigger data and the first user profile;
- determine, after receiving the event data, event content data representing information relating to occurrence of the event;
- select, based at least in part on the event content data, the first notification template, rather than the third notification template, for generating the first notification; and
- determine to emphasize the portion of the first output data based on the event content data, wherein processing the first output data to determine the first output audio data comprises processing the first output data to determine the portion of the first output audio data corresponding to the portion of the first output data being emphasized.

* * * * *